July 24, 1934.  C. J. WESTLING  1,967,695
VALVE
Filed Feb. 18, 1928   2 Sheets-Sheet 1

WITNESSES

INVENTOR
Carl J. Westling
BY
ATTORNEYS

July 24, 1934.   C. J. WESTLING   1,967,695
VALVE
Filed Feb. 18, 1928   2 Sheets-Sheet 2
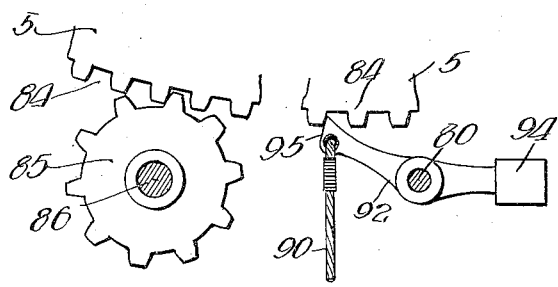
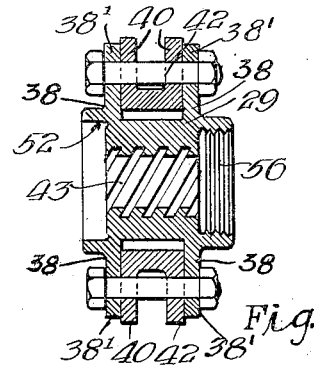
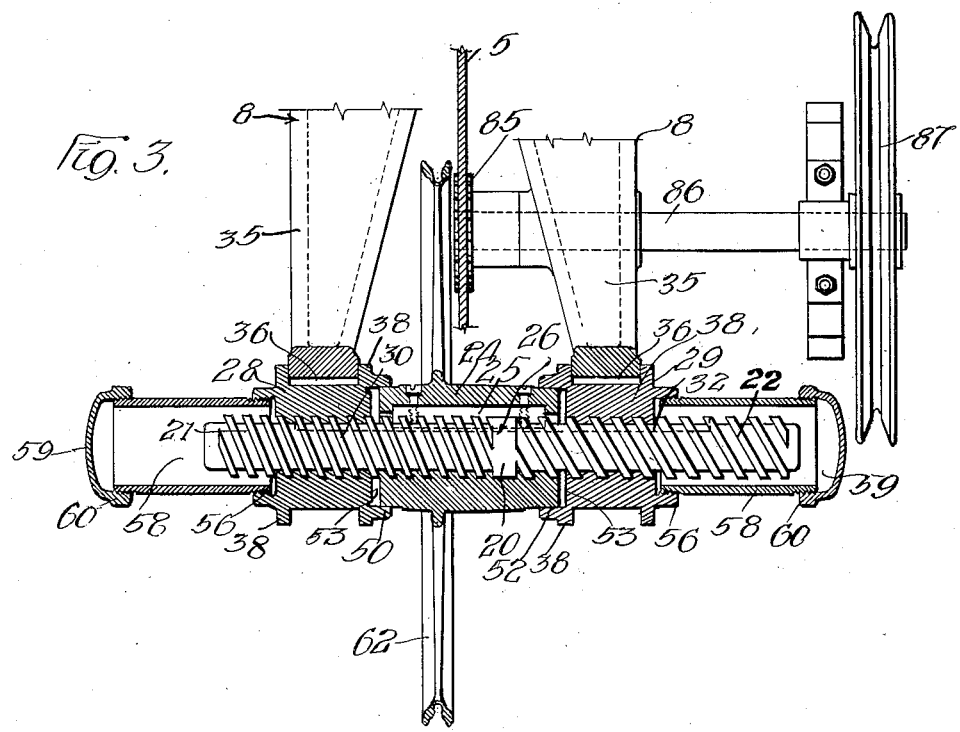

Patented July 24, 1934

1,967,695

UNITED STATES PATENT OFFICE 1,967,695

VALVE

Carl J. Westling, Chicago, Ill.

Application February 18, 1928, Serial No. 255,275

19 Claims. (Cl. 25—18)

This invention relates to valves and particularly to a goggle or spectacle valve for blast furnace or other gas pipes, to cut off the blast or flow of gas therethrough.

While I shall herein describe and illustrate a valve for blast furnace use, it is to be understood that the invention is not limited to this particular use nor to the specific structure which I have herein illustrated and described.

According to the present invention I provide a generally improved and simplified valve that may be conveniently installed between a pair of pipe sections, and a generally improved and simplified mechanism for tightly pressing the pipe ends against the plate or other valve member, and for relaxing the pressure until the valve member is moved or shifted, and restoring same to tighten the pipe ends upon the plate and seal the pipe or main adjacent the valve.

In actual practice the flow of gas through pipes or mains of this sort may be under relatively great pressure, and it is an object of my present invention to provide a generally improved and simplified mechanical contrivance for pressing the pipe ends together or against the valve plate or member with a powerful force or great pressure or effort. Another object is to provide with few parts, for obtaining a great power increase, and speed and movement reduction in the applied or imparted effort. Another object is to reduce the time as well as the effort required to move or shift the valve from one position to another. Another object is to reduce or avoid the imposition of twisting or other objectionable stresses upon the pressure frames or brackets so that the size and weight of these parts may be reduced. Another object is to provide for supplying the pressure uniformly around the pipe, together with an improved arrangement and mounting of the power increasing and movement decreasing means about the pipe, and an improved effort applying and connecting means therebetween. Another object is to provide a valve that may be operated either often or infrequently, and to maintain the valve in operative condition whether operated often or infrequently. Another object is to reduce the frictional resistance and to provide a structure in which the power increasing and movement decreasing means may be easily made and assembled or removed. Another object is to keep the valve from turning while the pressure is off. Another object is to connect the collars or pressure members at opposite sides of the valve for movement in unison and to hold them against relative rotation. Another object is the provision of a structure in which the power increasing and movement decreasing means may be entirely enclosed in an enclosure that may be filled with grease to lubricate this means and protect the same from dirt.

The invention is illustrated in the accompanying drawings, in which:

Fig. 3 is a detail section taken on the line 3—3 of Fig. 1 and with the pressure frames partially broken away;

Fig. 4 is a fragmentary and more or less diagrammatic view of the toothed margin of the valve member and the meshing pinion;

Fig. 5 is a fragmentary detail view of one of the dogs for keeping the valve from turning when the pressure is off;

Fig. 6 is a detail section through one of the traveling nuts on the forked extensions of the pressure frames and taken on the line 6—6 of Fig. 1.

Figures 1, 2:
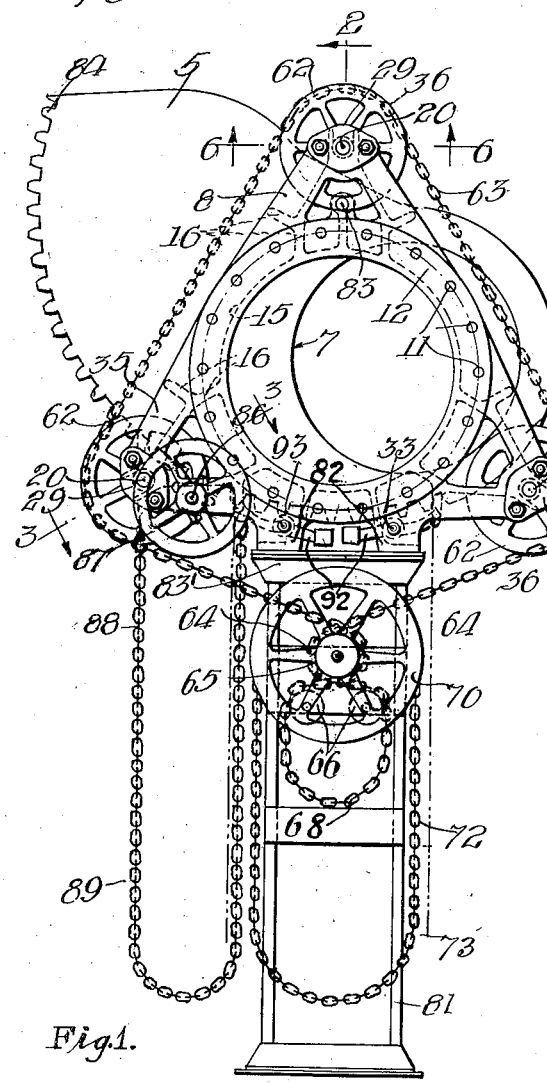
Fig. 1 is an elevational view of a valve and valve operating mechanism embodying the present invention.
Fig. 2 is a vertical section taken substantially on the line 2—2 of Fig. 1.

Referring to the drawings, the valve mechanism shown comprises a valve plate 5 interposed between two pressure frames 8, 8 which aline with and are tightly secured respectively to adjoining ends of pipe sections 6, 6. The valve plate 5 is provided with an opening 7 which may be moved into or out of registration with the bore of the pipe, to open and close the passage through the pipe by swinging said plate about a pivot 83 that supports it on one of the pressure frames. These pressure frames 8, 8 have integral annular and centrally disposed ring or collar portions 9, 9 interposed between the ends of the pipe sections 6, 6 and constituting in effect the adjacent pipe ends. The bores of the collars 9 register with each other and with the bores of the pipe sections 6, 6, the ends of which are suitably flanged at 10 and bolted or otherwise suitably secured at 11 to abutting radial flanges 12 of the collars 9. The valve plate 5 is placed between the adjacent ends of the collars 9, which ends are preferably thinned to form annular lips 13, which are preferably flared outwardly slightly, as shown, and bear firmly and with great pressure against the opposite faces of the valve plate 5.

I find that with the outward flaring of the annular lips 13 if the seating of these lips upon the valve plate becomes corroded after years of service or if for any reason these lips do not seat tightly the outward flaring presents outwardly directed surfaces which are conveniently accessible to a caulking tool for caulking the lips 13 back into proper seating engagement with the valve plate. The outward flaring of the lips 13, at the same time obviously provides a slight excess in length in each lip by means of which any failure to seat properly may be readily cured by forcing the lip toward the run of the pipe sections and into proper seating engagement with the valve plate.

The pressure frames 8, 8 selected for illustration are of generally triangular configuration, which may be varied, and each frame 8 has in addition to its integral hub or ring portion 9, integral tangential bracket arms or beams 35 that will be more particularly hereinafter described. The frames 8, 8 may be strengthened by ribs 16, as desired and the hubs 9 may be of channel formation with the second radial flanges 18, for strength.

For pressing the pipe ends, that is, the ends 13 of the collars 9, tightly against the opposite faces of the valve plate 5 to seal the pipe or main adjacent the plate 5, a double differential screw mechanism is provided. This differential screw mechanism comprises a plurality of double differential screws 20, three in the illustrated embodiment of the invention, and these double differential screws 20 are spaced equally distant apart about the collars 9, in order to apply the pressure uniformly around the pipe. Each double differential screw 20 (as shown in Fig. 3), has an external screw thread 21 on one end, or on one side of its intermediate portion, and an external screw thread 22 on its opposite end, or on the opposite side of the intermediate portion. Each of the screws 21 and 22 is preferably a double or multiple thread screw. The screws 21 and 22 are both right hand or both left hand screws, and the threads of the screw on one end are of different pitch from the threads of the screw on the other end of the same differential screw 20, so that the rectilinear movement imparted to the frames 8 at opposite sides of the valve plate 5 by these screws 20, as will be described presently, will be in the same direction, relative to the screw 20, but at different speeds. The angles of lead of the threads are preferably equal to or greater than the angle of friction, so that the screws will be efficient, yet give or impart an extremely small travel or movement to the frames 8.

For the purpose of rotating or turning the screws 20 a sleeve 24 is splined on the intermediate portion of each screw 20, as by means of a key 25 on the sleeve 24 engaging in a longitudinal keyway or groove 26 in the screw 20. For the purpose of transforming the rotation or turning movement of the screw 20 into rectilinear movement of the frames 8, each of the opposite screw threaded ends 21 and 22 of each screw 20 is provided with an internally threaded nut or collar 28 and 29, respectively. The internally threaded collars or nuts 28 and 29 are preferably of bronze, or other suitable material, and the internal threads in the nut 28 conform and have threaded engagement with the screw threads 21, while the internal threads in the other collar 29 conform and have threaded engagement with the screw threads 22. The opposite threaded ends of each of the differential screws 20 has an extension of the groove for the spline 25 these groove extensions being indicated at 30 and 32, respectively, and adapted for the purpose of delivering the oil or other lubricant within the screw enclosures to the screw threads on the screws 20 and to the cooperating screw threads in the nuts 28 and 29.

The frames 8 are shown as provided with three integral tangentially disposed beams or bracket arms 35 which converge and unite in triangular form, and the nuts 28 and 29 are fitted in forks 36 in the apices of such triangles, so that they may be easily assembled or removed. For the purpose of moving the frames 8 rectilinearly closer together or farther apart with the differential rectilinear movement of the nuts 28 and 29, each nut 28 and 29 is provided with a pair of longitudinally spaced radial flanges 38, 38. Each forked end 36 of one of the frames 8 fits snugly between the flanges 38, 38 of one of the nuts 28 for rectilinear movement with such nut, and each forked end 36 of the other frame 8 similarly fits between the flanges 38, 38 of one of the nuts 29 for rectilinear movement therewith.

One of the nuts, as 29, is shown in detail in Fig. 6. At diametrically opposite sides its flanges 38 are elongated at 38', 38', and these elongated flange portions 38', 38' fit snugly over the channeled sides 40 of the fork 36 and are secured thereto by bolts 42 at diametrically opposite sides. The internal screw thread is indicated at 43 in Fig. 6. The other nuts 28 are similar to the nuts 29 although they are reversed except as to the internal threads which conform to the screw threads 21 at the opposite end of the screw 20. The opposing ends of each pair of nuts 28 and 29 are provided with coaxial recesses 50 and 52, respectively, and the opposite ends of the sleeves 24 fit telescopically and preferably snugly into these recesses with the nuts having sliding movement thereon, suitable clearance spaces 53 being provided to permit rectilinear movement of the nuts 28 and 29 relative to the sleeve 24. The opposite end of each nut 28 and 29 is internally threaded at 56 and an enclosing tube or sleeve 58 is threaded into the threaded end 56 of each nut. The opposite or outer end of each sleeve 58 is provided with a closure cap 59, which may be threaded thereon at 60. It will be thus apparent that each screw shaft 20 is thereby entirely enclosed and the enclosure for each of these screw shafts 20 can be filled with grease, so that each shaft or screw will be well lubricated and protected from corrosion, dirt and other foreign elements.

For the purpose of rotating or turning the several sleeves 24, in unison and in the same direction to similarly and equally rotate the several screws 20, each of these sleeves 24 is provided with a chain wheel or sprocket sheave 62. Each chain wheel or sprocket sheave 62 is fixed to turn its sleeve 24 with it. These sheaves may or may not be formed integral with the sleeves 24. A rag chain 63 or other suitable flexible element for turning the wheels or sheaves 62 is trained over said wheels or sheaves 62, and this rag chain 63 has overlapping bights looped or trained at 64 over a chain wheel or chain sprocket 65 and down over sprockets or rollers 66 and looped at 68 to provide suitable slack. The chain sprocket 65 is fixed on and driven by a shaft 69 upon which a rag wheel or hand wheel 70 is fixed to turn the shaft 69 therewith. The rag wheel 70 may be turned or rotated by a crane or rag chain or other suitable element 72, which is trained over the wheel 70 and looped down at 73 to be conveniently accessible to the attendant. The sprocket 65 is shown as a double grooved sprocket, having one groove for each of the overlapping bights 64 of the chain 63. Obviously, by manipulating the chain 72 the shaft 69 may be turned or rotated and this rotation or turning of the shaft 69 is transmitted to and turns or rotates the several screws 20 through the chain 63. The screws 20 and nuts 28 and 29 provide a simple mechanical contrivance for obtaining a great power increase, and speed and movement reduction in the applied or imparted effort so that the pipe ends may be moved closer together, or farther apart, and be very tightly pressed against the opposite faces of the valve plate 5, to seal the pipe sections adjacent the valve, by the expenditure of very little effort on the part of the operator.

The pressure frames 8 at opposite sides of the valve plate 5 may be connected to hold them against relative turning movement without interfering with their rectilinear movement, by means of cross pins 80, as shown in Fig. 2. In the illustrated embodiment of the invention the valve and operating mechanism are mounted upon a pedestal or base 81. This arrangement is particularly suitable where the valve and other parts are relatively heavy, but a bracket or other suitable support may be employed instead of the pedestal 81. Where there is a pedestal, or alternatively a bracket or other supporting arrangement that will permit, the pressure frames 8 may be provided with integral feet 82 slidably mounted upon the top 83' of the pedestal or support and holding said frames against relative turning movement. In the drawings I have illustrated both the pin 80 and the feet 82, but it is to be understood that either may be employed alone for this purpose. Where there is such a supporting base or pedestal, the shaft 69, as well as the shaft 66' for the sheaves or rollers 66, may be journaled therein, as shown.

For turning or swinging the valve plate 5 from one position to another, about its pivot 83, its margin 84 is rounded about the axis of said pivot and is toothed as shown. The toothed margin 84 of the valve plate 5 meshes with a relatively small pinion 85, suitably mounted upon a shaft 86. The shaft 86 may be journaled in one of the frames 8 and this shaft 86 is turned by a chain wheel or sprocket sheave 87 fixed thereon and provided with a crane or other suitable chain 88, which chain 88 is trained over the wheel or sprocket 87 and looped down at 89 to be conveniently accessible to the attendant.

In use the lips 13 normally bear tightly against the valve plate 5, and to adjust or operate the valve from one position to the other, the relatively great pressure of the pipe ends or collars 9 upon the opposite faces of the valve plate is relaxed by manipulating the chain 72 and then by manipulation of the chain 88, the valve may be swung from one position to the other. Then by manipulation of the chain 72 in the opposite direction the pressure may be restored to tighten and press the pipe ends firmly and with great pressure against the opposite faces of the valve plate 5. For the purpose of preventing the valve 5 from turning while the pressure is off there are a pair of dogs 92 pivoted, as upon the pins 80, and each weighted at 94 to swing its opposite end 95 into engagement the toothed margin 84 of the valve plate 5. The dogs 92 may be released by suitable cords or other flexible elements 96.

As illustrative of the relative movements of a commercially practical embodiment of the invention, in one particular embodiment the hand chain wheel and the splined collar sheaves could be made three feet in diameter, the small drive sheave six inches in diameter and the differential travel of the nuts $\tfrac{1}{32}$ inch, thus obtaining a ratio of the hand chain travel to the pipe end movement of 19000 to 1 which shows the great power increase and speed reduction which is obtained. The pressure of the pipe ends on the valve plate in such an embodiment is about 800 to 1,000 pounds per lineal inch around the circumference of the frame end and this may be applied by a comparatively light pull on the chain which is manipulated by the attendant.

I claim:—

1. In combination, a pair of pipe ends, a valve member therebetween, means having a uni-directional differential rectilinear movement to press said pipe ends tightly against the valve member, said means comprising a differential screw shaft, and differential nut means upon and engaged with said shaft and with said pipe ends to move the pipe ends therewith.

2. In combination, a pair of pipe ends, a valve member therebetween, a pair of frame members one on each of the opposite sides of said valve member and attached to said pipe ends to move the pipe ends therewith, a differential screw shaft, and a pair of differential nut members upon and engaged with said screw shaft and with said frame members for moving the frame members with said nut members to press the frame members tightly against the opposite sides of the valve member.

3. In combination, a pair of pipe ends, a valve member therebetween, a pair of frame members, one on each of the opposite sides of said valve member and attached to said pipe ends, a differential screw shaft, a pair of differential nut members engaged with said screw shaft and with said frame members for moving the frame members at different speeds to press the same tightly against the opposite sides of the valve member, and means for holding said frame members against relative angular movement.

4. In combination, a pair of pipe ends, a valve member therebetween, a pair of frame members one on each of the opposite sides of said valve member and attached to said pipe ends to move the pipe ends therewith, a differential screw shaft, a pair of differential nut members upon and engaged with said screw shaft and with said frame members for moving the frame members with the nut members to press the frame members tightly against the opposite sides of said valve member, a sleeve member splined upon and adapted for turning said screw shaft, a sheave member fixed on said sleeve to turn the sleeve therewith, and a flexible element trained around and adapted for turning said sheave member.

5. In combination, a pair of pipe ends a valve member therebetween, a pair of frame members one on each of the opposite sides of the valve member and attached to said pipe ends to move the pipe ends therewith, forks on said frame members, a differential screw shaft, and a pair of differential nut members fitted on said forks for easy assembly and removal and engaged with said screw shaft and with said frame members for moving the frame members therewith to press the frame members tightly against the opposite sides of the valve member.

6. In combination, a pair of pipe ends, a valve member therebetween, a differential screw shaft, a pair of differential nut members upon and engaged with said shaft and with said pipe ends to press the pipe ends tightly against the opposite sides of the valve member, a sleeve splined upon the screw shaft between said nut members and adapted for turning said shaft, said sleeve having telescopic engagement at its ends with said nut members, and tubular enclosures enclosing the ends of the shaft and secured to said nut members, said enclosures being adapted to contain a lubricant for the screw and protecting same against dirt.

7. In a device of the class described, the combination with a valve plate of a triangular pressure frame having a centrally disposed collar portion adapted for attachment to a pipe end and integral tangential extensions forming the sides of said frame, and differential screw devices mounted at the apices of said frame for pressing the collar portion against the valve plate.

8. In combination, a pair of pipe ends, a valve member therebetween, and means having a unidirectional differential rectilinear movement to press the pipe ends tightly against the valve member, said means comprising a plurality of power increasing and movement reducing devices spaced about the pipe ends for distributing the applied pressure uniformly about the pipe ends, said pipe ends having openings of full pipe bore diameter at said valve member.

9. In combination, a pair of pipe ends, a valve member therebetween, a pair of frame members, one on each of the opposite sides of said valve member and having ring portions attached to said pipe ends, said frame members having openings of full pipe bore diameter at said valve member, a plurality of differential screws spaced equidistantly completely about the pipe ends and operating to move the frame members simultaneously in the same direction and at different speeds to press the ring portions tightly against the valve member at all points about the engaging peripheries of said ring portion and to relax same, and means operable to rotate the screws uniformly in either direction including sprocket members concentrically mounted with respect to said screws and disposed intermediate the differential threads thereof.

10. In combination, a pair of pipe ends, a pivoted valve plate therebetween, a pair of frame members one on each of the opposite sides of the valve member, said frame members each comprising a central collar and having tangentially disposed beams or bracket arms converging and uniting at their outer ends, open forks at the uniting outer ends of said beams, a plurality of screws spaced about the pipe ends and fitted in said open forks, and nut members upon and engaged with the screws and with the frame members for pressing the collars tightly against the opposite faces of the valve member.

11. In combination, a pair of pipe ends, a pivoted valve plate therebetween, a pair of frame members one on each of the opposite sides of the valve plate, said frame members each comprising a central collar and having tangentially disposed beams or bracket arms converging and uniting at their outer ends, open forks at the uniting outer ends of said beams, a plurality of screws spaced about the pipe ends and fitted in said open forks, nut members upon and engaged with the screws and with the frame members for pressing the collars tightly against the opposite faces of the valve member, a sprocket sheave for each of said screws, an actuating sheave, and a chain trained about said actuating sheave and about said first sheaves for transmitting the applied effort to said screws.

12. In combination, a pair of flanged pipe ends, a pair of frame members each having a collar attached to one of the pipe ends and having forked bracket arms, a pivoted valve plate between said collars, screw shafts spaced about the pipe ends and fitted in the bracket forks, nuts splined upon said screws and engaged therewith and with the bracket arms, a sleeve splined upon said screw to turn same therewith, a sheave member fixed on each sleeve to turn same therewith, an actuating sheave, a flexible element trained around said actuating sheave and around said first sheaves for transmitting the applied effort to said screws, and means connecting the collars to move in unison, but at different speeds, meanwhile holding same against relative angular movement.

13. A pressure frame of the class described of triangular shape and having a centrally disposed collar portion adapted for attachment to a pipe end and integral extensions tangentially disposed with respect to said collar portion and forming the sides of said frame, the outer ends of said extensions uniting to form the apices of said frame.

14. In combination, a pipe end having an internal bore and a pressure frame having a centrally disposed ring portion with tangentially disposed beam extensions converging and uniting at their outer ends, and forming triangular frames the ring portion of said pressure frame having an opening for alignment with said pipe bore and the beam formation of said frame permitting a pull pipe bore diameter of said pressure frame opening.

15. In combination, a pair of pipe ends, a valve member pivoted for swinging movement between said pipe ends, a pair of frame members one on each of the opposite sides of said valve member and attached to said pipe ends, said frame members having openings for registration with each other and with the pipe bores and each of full pipe bore diameter from end to end, and a plurality of interconnected power increasing devices spaced circumferentially about said frame members for pressing said frame members against the opposite sides of said valve member and for releasing same therefrom.

16. In a goggle valve the combination of a movable valve plate and a pressure frame having means for attaching the frame to a pipe end, said frame having an opening therethrough, and an annular seating lip on said frame and surrounding one end of said opening, said lip being flared outwardly for convenient access to a caulking tool to be forced inwardly into engagement with the plate.

17. In combination, a pair of pipe ends, a valve member therebetween, a plurality of differential screw devices arranged about the pipe ends and means for operating said screw devices simultaneously to impart differential movement to said pipe ends in line with the axis of the pipe ends uniformly about the periphery thereof, said operating means including sprockets for the respective differential screw devices and chain means trained about and interconnecting said sprockets, said sprockets being concentrically mounted intermediate the threads of said screw devices.

18. In combination, a pair of pipe ends, a valve member therebetween, a plurality of differential screw devices arranged about the pipe ends, means for operating said screw devices simultaneously to impart differential movement to said pipe ends in line with the axis of the pipe ends uniformly about the periphery thereof, said operating means including sprockets concentrically mounted with respect to said screw devices for the respective differential screw devices and chain means trained about and interconnecting said sprockets, and an operator operatively connected with one of said screw devices and having an operating chain therefor.

19. In combination, a pair of pipe ends, pressure frames secured to said pipe ends, a valve member therebetween, a plurality of differential screw devices arranged about the periphery of said pressure frames, operating means for imparting axial differential movement to said pressure frames uniformly about the periphery thereof, said operating means comprising sprockets concentrically mounted with respect to said screw devices and disposed intermediate the differential threads thereof, and means trained over and interconnecting said sprockets and engaged by a common actuating member for simultaneously actuating all of said operating means.

CARL J. WESTLING.